United States Patent
Chikugo et al.

(10) Patent No.: US 9,548,503 B2
(45) Date of Patent: Jan. 17, 2017

(54) FUEL CELL SYSTEM AND OPERATING METHOD THEREOF

(75) Inventors: Hayato Chikugo, Yokohama (JP); Kenji Yonekura, Sagamihara (JP); Ken Nakayama, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 1032 days.

(21) Appl. No.: 13/810,836

(22) PCT Filed: Jul. 20, 2011

(86) PCT No.: PCT/JP2011/066477
§ 371 (c)(1),
(2), (4) Date: Apr. 1, 2013

(87) PCT Pub. No.: WO2012/011501
PCT Pub. Date: Jan. 26, 2012

(65) Prior Publication Data
US 2013/0202976 A1    Aug. 8, 2013

(30) Foreign Application Priority Data

Jul. 21, 2010  (JP) .................. 2010163747
Jun. 21, 2011  (JP) .................. 2011137634

(51) Int. Cl.
*H01M 8/04*    (2016.01)
*H01M 8/24*    (2016.01)
*B60L 11/18*   (2006.01)

(52) U.S. Cl.
CPC ............ *H01M 8/04* (2013.01); *B60L 11/1896* (2013.01); *B60L 11/1898* (2013.01); *H01M 8/04089* (2013.01); *H01M 8/04156* (2013.01); *H01M 8/04746* (2013.01); *H01M 8/2485* (2013.01); *H01M 8/04097* (2013.01); *H01M 2250/20* (2013.01); *Y02E 60/50* (2013.01)

(58) Field of Classification Search
None
See application file for complete search history.

(56) References Cited

U.S. PATENT DOCUMENTS

| 8,017,277 B2 | 9/2011 | Bono |
| 8,118,129 B2 | 2/2012 | Ito et al. |
| 2007/0243426 A1 | 10/2007 | Bono |

(Continued)

FOREIGN PATENT DOCUMENTS

| CN | 1965433 A | 5/2007 |
| CN | 101259863 | 9/2008 |

(Continued)

OTHER PUBLICATIONS

Machine Translation of Akashi (JP 2007073280 A).*
Chinese Office Action, Aug. 6, 2014, 9 pages.

*Primary Examiner* — Patrick Ryan
*Assistant Examiner* — Haixia Zhang
(74) *Attorney, Agent, or Firm* — Foley & Lardner LLP

(57) ABSTRACT

A fuel cell system includes: a fuel cell stack (S) formed by stacking multiple unit cells (C) horizontally and having, in the stacked body, manifolds through which to supply and discharge reaction gases to and from each of the unit cells (C); and drainage paths (1A, 1B) extending from an anode-off-gas discharge manifold (M), on both end sides of the fuel cell stack (S) in the stacking direction of the unit cells, respectively.

1 Claim, 13 Drawing Sheets

(56) References Cited

U.S. PATENT DOCUMENTS

2008/0217087 A1    9/2008  Ito et al.

FOREIGN PATENT DOCUMENTS

| JP | 2004-327059 A |   | 11/2004 |
|----|---------------|---|---------|
| JP | 2005-251526 A |   | 9/2005  |
| JP | 2007073280 A  | * | 3/2007  |
| JP | 2008-27743 A  |   | 2/2008  |
| JP | 2008-213742 A |   | 9/2008  |
| JP | 2009-123517 A |   | 6/2009  |
| JP | 2009-158338 A |   | 7/2009  |
| JP | 2009-289563 A |   | 12/2009 |
| JP | 2010-126015 A |   | 6/2010  |

* cited by examiner (A)

(B)

(A)

(B)

(C)

(A)

(B)

(C)

(A)

(B)

(A)

(B)

FUEL CELL SYSTEM AND OPERATING METHOD THEREOF

TECHNICAL FIELD

The present invention relates to a fuel cell system including a fuel cell stack in which multiple unit cells are stacked, and relates particularly to a fuel cell system and an operating method thereof which have an excellent function of discharging resultant water and impurity gases contained in an anode off-gas of the fuel cell stack.

BACKGROUND ART

A fuel cell system described in, for example, Patent Literature 1 is a conventional fuel cell system having a function of discharging resultant water and gases. The fuel cell system of Patent Literature 1 is designed to be mounted to a vehicle and has such a structure that an anode off-gas from a fuel cell stack is introduced into a gas-liquid separator through an off-gas flow path. The anode off-gas contains unreacted hydrogen and resultant water. The gas-liquid separator incorporates an ion exchange filter which partitions the inner space of the gas-liquid separator vertically and a chamber below the ion exchange filter for holding a certain amount of resultant water.

Moreover, the fuel cell system circulates hydrogen separated by the gas-liquid separator to a hydrogen supply system of the fuel cell stack and also drains the resultant water separated by the gas-liquid separator to the outside by utilizing the pressure and flow speed of the hydrogen. In this way, the resultant water is prevented from flowing into the off-gas flow path when the vehicle is tilted.

CITATION LIST

Patent Literature

Patent Literature 1: Japanese Patent Application Publication No. 2009-123517

SUMMARY OF INVENTION

Technical Problems

Meanwhile, in the conventional fuel cell system as described above, the resultant water discharged from the fuel cell stack may possibly flow backward in the off-gas flow path before reaching the gas-liquid separator if the hydrogen circulation speed is low. For this reason, these components need to be arranged in such a way as to secure a sufficient vertical gap between the fuel cell stack and the off-gas flow path and gas-liquid separator.

This leads to problems that if the conventional fuel cell system is to be mounted to a vehicle having a small, limited space under its floor, arranging the fuel cell system under the floor may be extremely difficult, and that if the vertical gap between the components is not large enough, the drainage may be difficult when the vehicle is tilted. There has been a need for solutions to these problems.

Note that the hydrogen circulation speed depends upon the output of a drive device such as a circulation pump. Thus, to reduce this circulation speed is also to reduce the output of the drive device and is therefore highly effective in achieving reduction in the size and weight of the system structure and reduction in the power consumption.

The present invention has been made in view of the above conventional problems, and an object thereof is to provide a fuel cell system and an operating method thereof which can achieve excellent mountability under the floor of a vehicle and a good water drainage function even in a case of a system with low hydrogen circulation speed.

Solution to Problems

An aspect of the present invention is a fuel cell system including a fuel cell stack formed by stacking multiple unit cells horizontally and having, in the stacked body, manifolds through which to supply and discharge reaction gases to and from each of the unit cells. This fuel cell system includes drainage paths extending from an anode-off-gas discharge manifold, on both end sides of the fuel cell stack in a stacking direction of the unit cells, respectively.

Another aspect of the present invention is an operating method of a fuel cell system. This method includes the steps of: arranging a fuel cell stack formed by stacking multiple unit cells, in such a direction that a stacking direction of the unit cells is horizontal; providing, in the fuel cell stack, manifolds through which to supply and discharge reaction gases to and from each of the unit cells; providing drainage paths extending from an anode-off-gas discharge manifold, on both end sides of the fuel cell stack in the stacking direction of the unit cells, respectively; providing, in the drainage paths on both end sides, liquid-water buffers at positions upstream of outlet ports to an outside, and control valves which open and close the outlet ports to the outside, respectively, the liquid-water buffers being designed to hold resultant water; and further providing an off-gas flow path which communicates with at least one of the drainage paths on both end sides, and a purge valve which discharges an impurity gas from the off-gas flow path. Furthermore, the method includes the step of: opening the two control valves for a period of time required to drain the liquid-water buffers, and opening the purge valve if an amount of the impurity gas dischargeable from the control valves is smaller than an amount of the impurity gas generated in the fuel cell stack.

DESCRIPTION OF EMBODIMENTS

Figure 1:
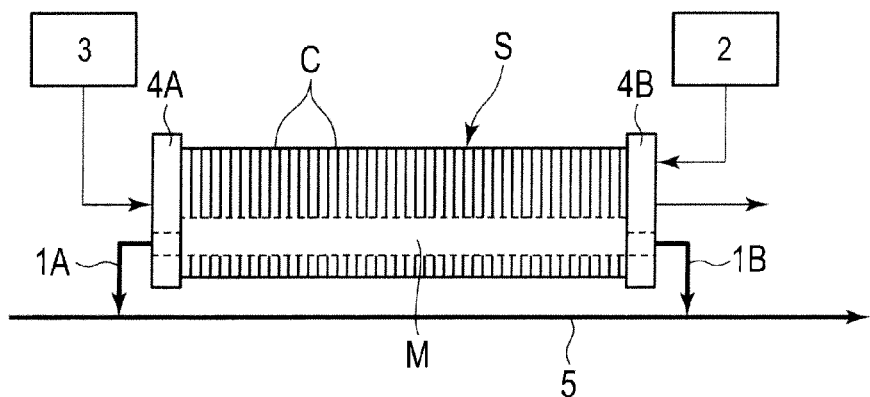
FIG. 1 is an explanatory diagram showing an embodiment of a fuel cell system of the present invention.

A fuel cell system shown in FIG. 1 includes a fuel cell stack S formed by stacking multiple unit cells C horizontally and having, in the stacked body, manifolds (M) through which to supply and discharge reaction gases to and from each unit cell C. Moreover, the fuel cell system includes drainage paths 1A and 1B extending from an anode-off-gas discharge manifold M, on both end sides of the fuel cell stack S in the unit-cell stacking direction, respectively.

Moreover, the fuel cell system includes a unit 2 which supplies the fuel cell stack S with an anode gas (hydrogen) serving as one reaction gas and a unit 3 which supplies the fuel cell stack S with a cathode gas (air) serving as the other reaction gas. The fuel cell system also includes fluidic devices such as valves and pumps and control devices, which are not illustrated herein.

Each unit cell C is a known unit cell including: a membrane electrode assembly (MEA) in which an electrolyte membrane is held between a fuel electrode (anode) and an air electrode (cathode); and two separators which sandwiches this membrane electrode assembly. Note that the membrane electrode assembly includes those having gas diffusion layers on the outer sides of the fuel electrode and the air electrode.

Moreover, each unit cell C has manifold holes for the supply and discharge so that the anode gas and the cathode gas can flow. In the stacked state, the manifold holes communicate with one another to form their corresponding manifolds. Further, each unit cell C is provided with a manifold hole for supply and discharge of a cooling fluid in some cases.

By stacking the multiple unit cells C horizontally, the fuel cell stack S forms, in the stacked body, the manifold for the supply of the anode gas and the discharge of the anode off-gas and the manifold for supply of the cathode gas and the discharge of the cathode off-gas. FIG. 1 shows the anode-off-gas discharge manifold M. The anode off-gas contains hydrogen left unreacted, impurity gases such as nitrogen having passed through the electrolyte membrane, resultant water, etc.

Moreover, the fuel cell stack S includes end plates 4A and 4B at both ends thereof in the unit-cell stacking direction. The end plates 4A and 4B apply certain pressure to each unit cell C in the stacking direction to maintain that state.

As mentioned earlier, the above fuel cell system includes the drainage paths 1A and 1B extending downward from the anode-off-gas discharge manifold M, on both end sides of the fuel cell stack S, respectively. These drainage paths 1A and 1B include drainage ports formed in the end plates 4A and 4B of the fuel cell stack S and piping connected thereto. Moreover, in the illustrated fuel cell system, the drainage paths 1A and 1B are each connected to common exhaust piping 5.

The above fuel cell system is mounted to an electric vehicle, for example. Here, the fuel cell system is mounted in such a way that the stacking direction of the unit cells C in the fuel cell stack S coincides with the left-right direction of the vehicle or the front-rear direction of the vehicle. As the anode gas and the cathode gas are supplied to the fuel cell stack 5, the electrochemical reaction occurs in each unit cell C, thereby generating electric energy.

Moreover, in the electric generation described above, the fuel cell system discharges the anode off-gas and the cathode off-gas from the fuel cell stack S. Specifically, the fuel cell system discharges the resultant water and the impurity gases such as nitrogen contained in the anode off-gas to the outside. Here, since the fuel cell system includes the drainage paths 1A and 1B at both ends of the fuel cell stack S, the resultant water and the impurity gases are discharged through these drainage paths 1A and 1B. Moreover, even when the fuel cell stack S is tilted with its one side up due to the condition of the road the vehicle is driving or the like, the fuel cell system drains the water through the drainage path 1A (1B) at the lower position without fail and discharges the impurity gases mainly through the drainage path 1B (1A) at the higher position.

Because the above fuel cell system includes the drainage paths 1A and 1B at both ends of the fuel cell stack S as described above, the height of the system structure can be made small. This offers excellent mountability under the floor of the vehicle which is a small, limited space. Moreover, the fuel cell system is capable of securely discharging the resultant water and the impurity gases even in a tilted state. Thus, even systems with low hydrogen circulation speed can achieve good drainage and gas discharge functions.

FIGS. 2 to 8 are diagrams describing other seven embodiments of the fuel cell system according to the present invention. Note that the same parts as those in the foregoing embodiment will be denoted by the same reference signs, and detailed description thereof will be omitted. Further, each of the fuel cell systems of the following embodiments includes components such as the anode-gas supply unit (reference sign 2 in FIG. 1) and the cathode-gas supply unit (reference sign 3 in FIG. 1) although they not illustrated.

Figure 2:
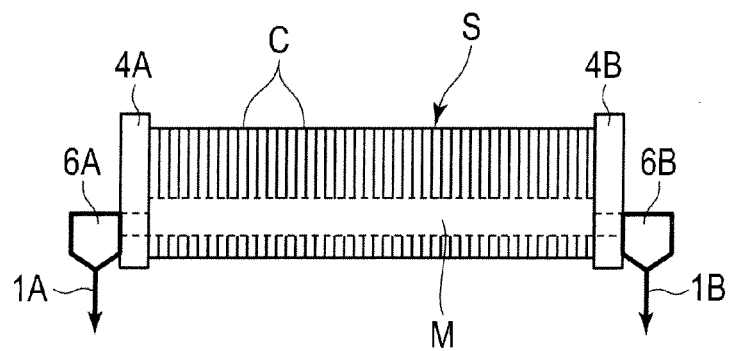
FIG. 2 is an explanatory diagram showing another embodiment of the fuel cell system of the present invention.

The fuel cell system shown in FIG. 2 includes the drainage paths 1A and 1B extending from the anode-off-gas discharge manifold M, on both end sides of the fuel cell stack S in the unit-cell stacking direction, respectively. Moreover, the fuel cell system includes a liquid-water buffer in at least one of the drainage paths 1A and 1B on both end sides at a position upstream of an outlet port to the outside, the liquid-water buffer being designed to hold the resultant water. In the illustrated example, the fuel cell system includes liquid-water buffers 6A and 6B in the drainage paths 1A and 1B on both end sides.

The above fuel cell system can achieve operations and effects equivalent to those of the foregoing embodiment. In addition, provided with the liquid-water buffers 6A and 6B which hold a certain amount of resultant water, the fuel cell system can more securely prevent a situation where the resultant water returns to the fuel cell stack S side due to an abrupt change in inclination. That is, it is possible to prevent back flow of the resultant water even when a vehicle equipped with the fuel cell system is abruptly tilted or when the vehicle is subjected to large acceleration.

Figure 3:
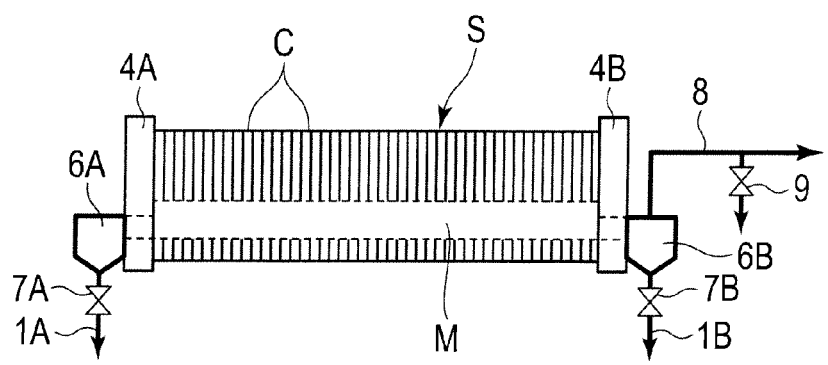
FIG. 3 is an explanatory diagram showing another embodiment of the fuel cell system of the present invention.

The fuel cell system shown in FIG. 3 includes the drainage paths 1A and 1B extending from the anode-off-gas discharge manifold M, on both end sides of the fuel cell stack S in the unit-cell stacking direction, respectively. Moreover, the fuel cell system includes at least one of the liquid-water buffer, at a position upstream of the outlet port to the outside, and a control valve in at least one of the drainage paths 1A and 1B on both end sides, the liquid-water buffer being designed to hold the resultant water, the control valve being designed to open and close the outlet port to the outside. In the illustrated example, the fuel cell system includes the liquid-water buffers 6A and 6B and control valves 7A and 7B in the drainage paths 1A and 1B on both end sides, respectively.

The fuel cell system including the control valve 7A and/or 7B can employ any of the following configurations (a) to (g).
(a) A configuration in which the control valve is provided in only one drainage path.
(b) A configuration in which the control valve is provided in both drainage paths.
(c) A configuration in which the liquid-water buffer is provided in one drainage path, and the control valve is provided in that same drainage path.
(d) A configuration in which the liquid-water buffer is provided in one drainage path, and the control valve is provided in the other drainage path.
(e) A configuration in which the liquid-water buffer is provided in one drainage path, and the control valve is provided in both drainage paths.
(f) A configuration in which the liquid-water buffer is provided in both drainage paths, and the control valve is provided in one drainage path.
(g) A configuration in which the liquid-water buffer and the control valve are each provided in both drainage paths (the configuration of FIG. 3).

Moreover, the fuel cell system of this embodiment includes an off-gas flow path 8 communicating with at least one of the drainage paths 1A and 1B on both end sides and also includes an impurity-gas purge valve 9 in this off-gas flow path 8. In the illustrated example, the drainage path 1B on the right side in the drawing includes the off-gas flow path 8 extending from the liquid-water buffer 6B to the outside and the purge valve 9 branching off the off-gas flow path 8.

The above fuel cell system can achieve operations and effects equivalent to those of the foregoing embodiments. In addition, the fuel cell system discharges the resultant water through the control valves 7A and 7B and also discharges the impurity gases (nitrogen gas in particular) in the anode off-gas through the purge valve 9. Here, the fuel cell system closes the valves 7A, 7B, and 9 when discharging the resultant water and the impurity gases is not necessary. In this way, excessive discharge of the unreacted hydrogen in the anode off-gas is prevented, thereby making it possible to collect, circulate, and reuse the hydrogen through the off-gas flow path 8.

Figure 4:
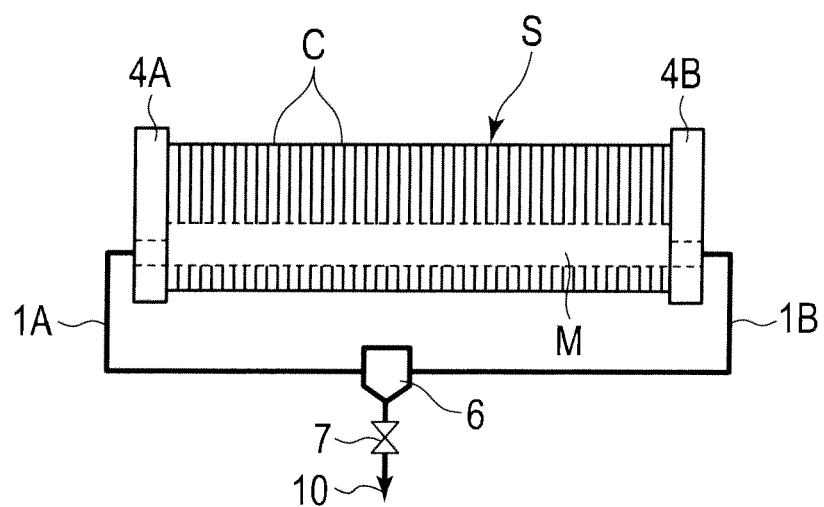
FIG. 4 is an explanatory diagram showing another embodiment of the fuel cell system of the present invention.

The fuel cell system shown in FIG. 4 includes the drainage paths 1A and 1B extending from the anode-off-gas discharge manifold M, on both end sides of the fuel cell stack S in the unit-cell stacking direction, respectively. Moreover, in the fuel cell system, the drainage paths 1A and 1B on both end sides include a common outlet port 10 to the outside and the control valve 7 which opens and closes this outlet port 10. In the illustrated example, the drainage paths 1A and 1B on both end sides include a common liquid-water buffer 6 communicating therewith and have the control valve 7 and the outlet port 10 in a series configuration at a position downstream of this liquid-water buffer 6. In this case, the fuel cell system uses the gravity to make the resultant water flow out, and therefore the liquid-water buffer 6, the control valve 7, and the outlet port 10 are arranged on a lower side of the fuel cell stack S as a matter of course.

The above fuel cell system can achieve operations and effect equivalent to those of the foregoing embodiments. In addition, the fuel cell system can achieve a good drainage function with one liquid-water buffer 6, one control valve 7, and one outlet port 10, and the system structure can therefore be reduced further in size and weight.

Figure 5:
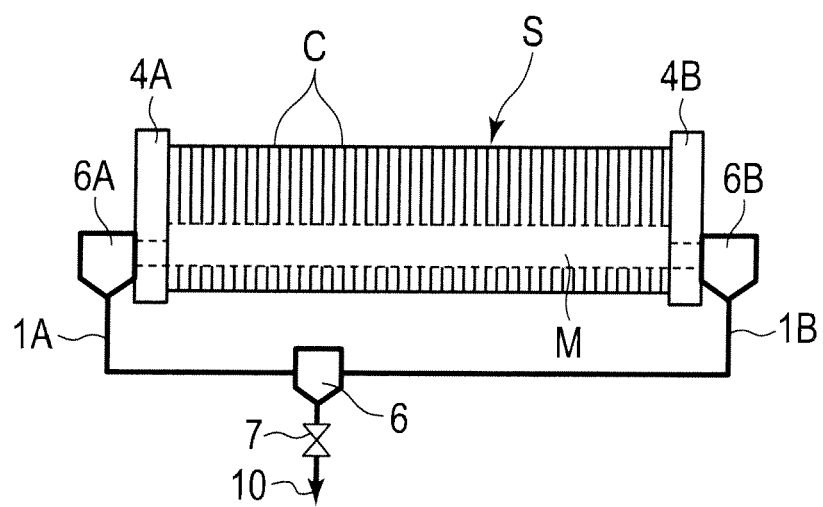
FIG. 5 is an explanatory diagram showing another embodiment of the fuel cell system of the present invention.

The fuel cell system shown in FIG. 5 has a configuration which is the configuration shown in FIG. 4, except that the liquid-water buffers 6A and 6B are provided to the drainage paths 1A and 1B on both end sides. This fuel cell system can also achieve operations and effects equivalent to the fuel cell system shown in FIG. 4. In addition, the liquid-water buffer 6A and 6B on both sides can more securely prevent a situation where the resultant water returns to the fuel cell stack S side, thereby making it possible to prevent back flow of the resultant water due to an abrupt change in posture or an abrupt acceleration.

Figure 6:
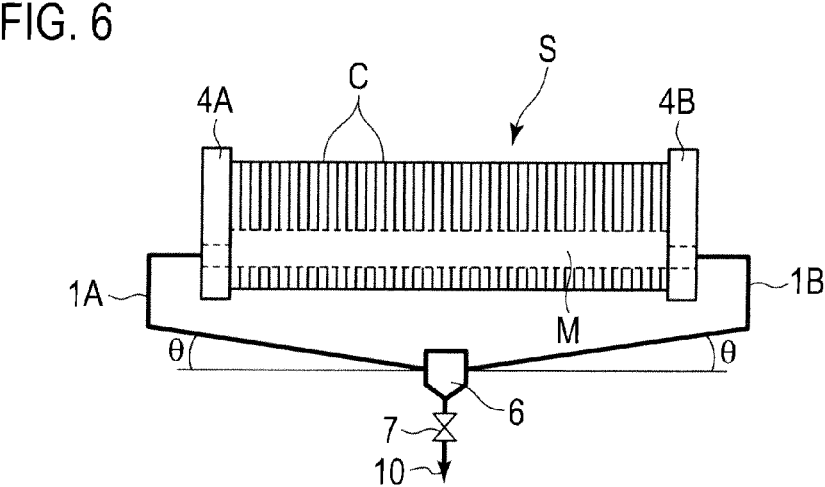
FIG. 6 is an explanatory diagram showing another embodiment of the fuel cell system of the present invention.

The fuel cell system shown in FIG. 6 has the configuration shown in FIG. 4, except that the drainage paths 1A and 1B on both end sides are inclined downwardly toward the common outlet port 10. An inclination angle θ of each of the drainage paths 1A and 1B corresponds, for example, to the maximum inclination angle in the front-rear or left-right direction required to a vehicle to be equipped with the fuel cell system.

This fuel cell system can also achieve operations and effects equivalent to the fuel cell system shown in FIG. 4. In addition, the fuel cell system can more securely prevent a situation where the resultant water returns to the fuel cell stack S side by using the simple structure involving only the inclination of the drainage paths 1A and 1B.

Figure 7:
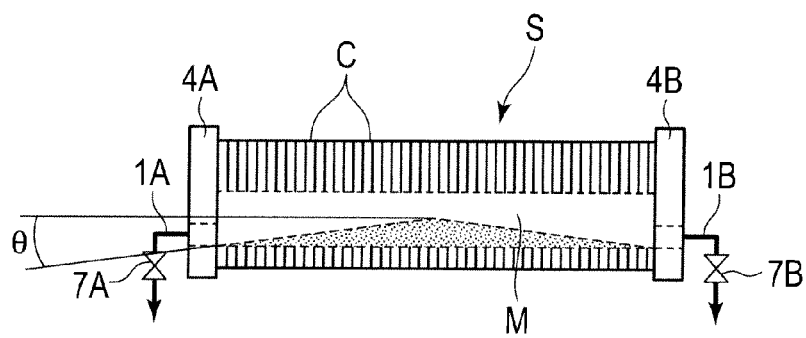
FIG. 7 is an explanatory diagram showing another embodiment of the fuel cell system of the present invention.

The fuel cell system shown in FIG. 7 includes the drainage paths 1A and 1B extending from the anode-off-gas discharge manifold M, on both end sides of the fuel cell stack S in the unit-cell stacking direction and also includes the control valves 7A and 7B in the drainage paths 1A and 1B on both end sides, respectively. Moreover, in the fuel cell system, the bottom surface of the anode-off-gas discharge manifold M in the fuel cell stack S is inclined downwardly to both end sides from a middle portion thereof in the unit-cell stacking direction being the highest point.

In the illustrated example, an approximate center of the bottom surface in the unit-cell stacking direction is set as the highest point. The inclined bottom surface as described above may be formed by arranging a suitable member inside the anode-off-gas discharge manifold M. Alternatively, the manifold hole in each unit cell C may be formed in such a way that a portion thereof is slightly offset from one unit cell C to another; in this way, stacking the unit cells C can make the manifold holes communicate with each other to form the anode-off-gas discharge manifold M and form its bottom surface in the inclined state.

The above fuel cell system can achieve operations and effects equivalent to those of the foregoing embodiments. In addition, since the fuel cell system discharges the resultant water from the fuel cell stack S without fail by using the simple structure involving only the inclination of the bottom surface of the anode-off-gas discharge manifold M, the simple structure can contribute to further reduction in the size and weight of the system structure.

Figure 8:
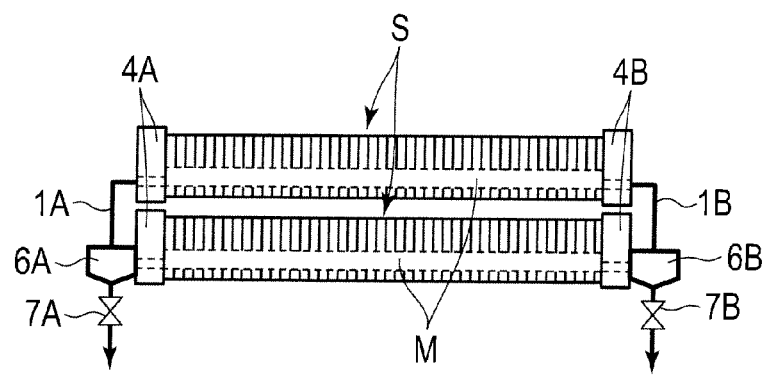
FIG. 8 is an explanatory diagram showing another embodiment of the fuel cell system of the present invention.

The fuel cell system shown in FIG. 8 includes two, upper and lower fuel cell stacks S and S. Moreover, the fuel cell system is configured such that it includes common drainage paths 1A and 1B, common liquid-water buffers 6A and 6B, and common control valves 7A and 7B on both end sides of the upper and lower fuel cell stacks S and S, respectively. As described above, the fuel cell system of the present invention is applicable also to a configuration including multiple fuel cell stacks S and S. In this case, too, operations and effects equivalent to those of the foregoing embodiments can be achieved.

FIGS. 9 to 12 are diagrams describing four embodiments of the operating method of the fuel cell system according to the present invention. Note that in the fuel cell system, the same components as those in the foregoing embodiments will be denoted by the same reference signs, and detailed description thereof will be omitted.

Figure 9:
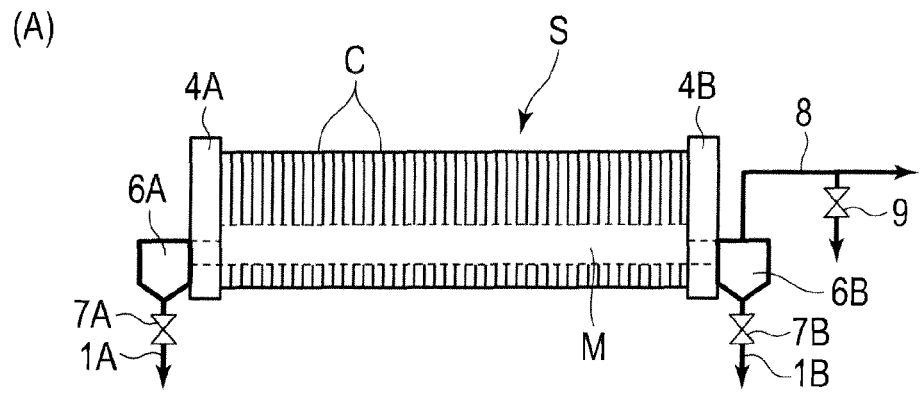
FIG. 9 is an explanatory diagram showing a fuel cell system (Part (A)) and a timechart showing the operations of valves (Part (B)), according to an embodiment of an operating method of the fuel cell system of the present invention.
Figure 9:
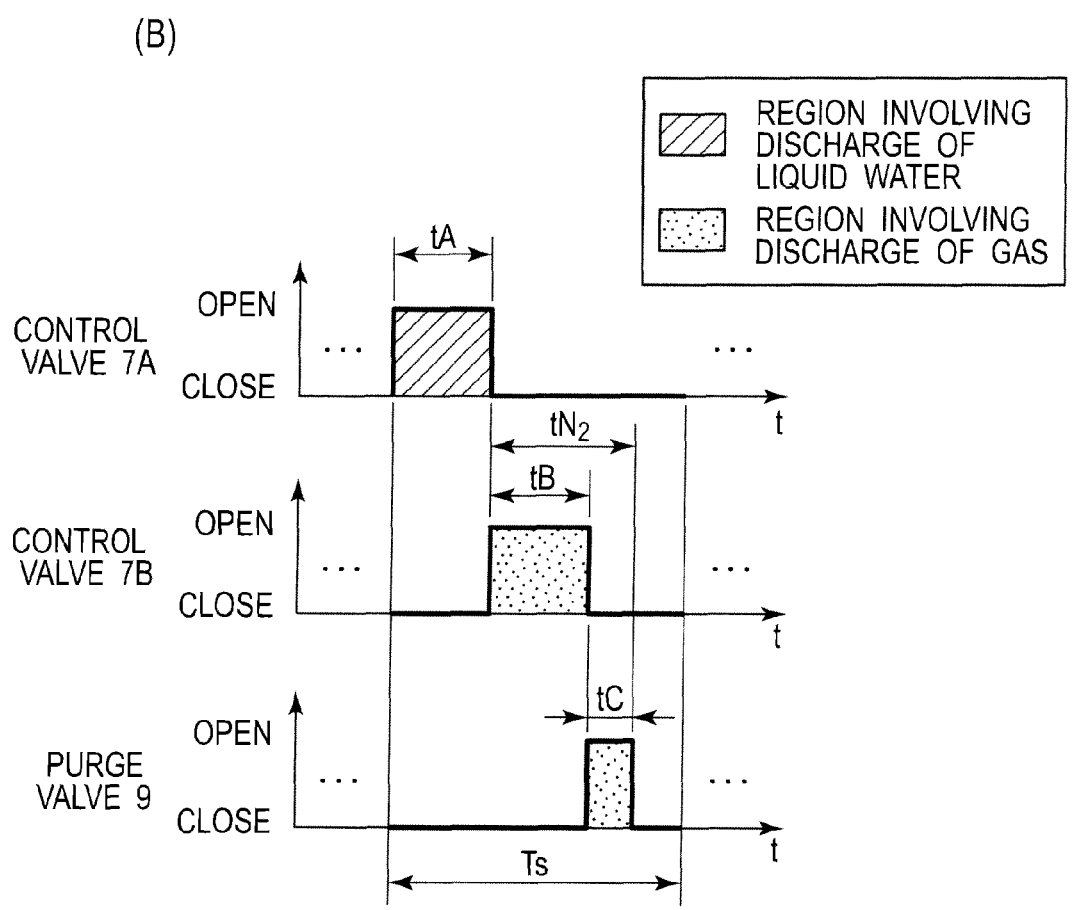
Figure 10:
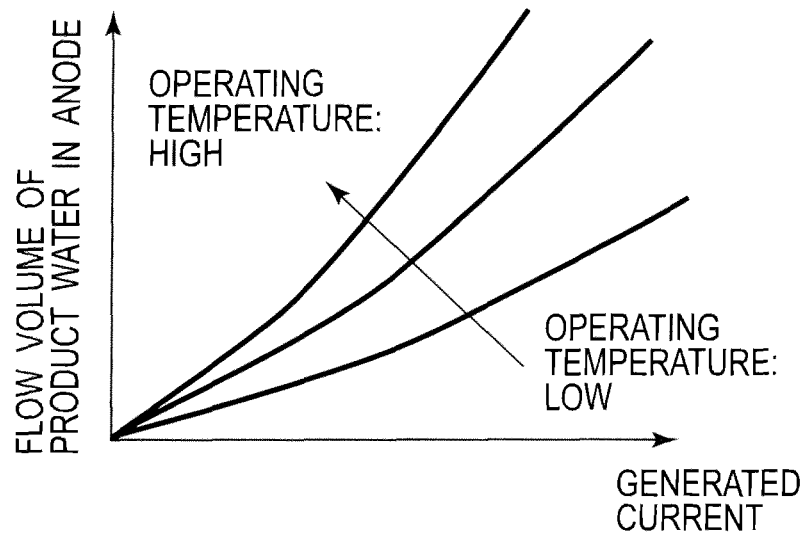
FIG. 10 is a graph showing the relationship between generated current and the amount of product water on an anode side (Part (A)), and a graph showing the relationship between the generated current and the amount of impurities flowing into the anode side (Part (B)).
Figure 10:
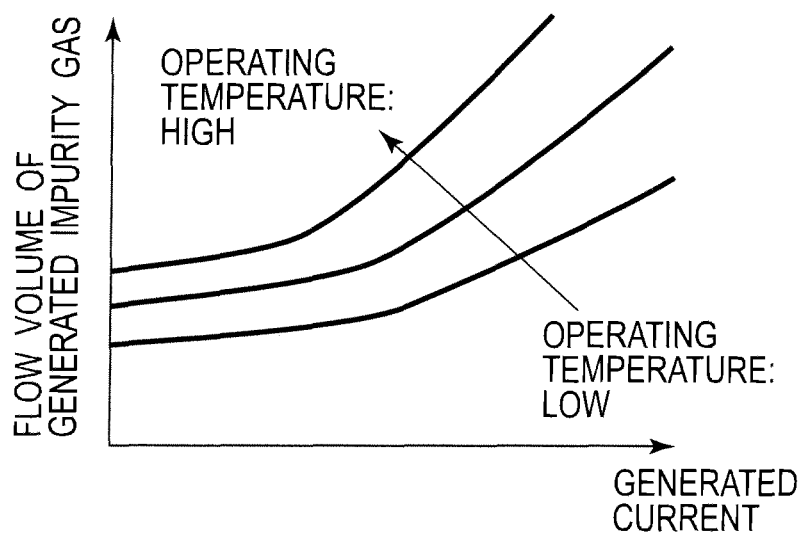

The fuel-cell-system operating method shown in FIG. 9 is an operating method of a fuel cell system shown in Part (A) of the same drawing. Its fuel cell stack S has the drainage paths 1A and 1B, the liquid-water buffers 6A and 6B, and the control valves 7A and 7B on both end sides thereof in the unit-cell stacking direction, respectively. Moreover, the fuel cell stack S has the off-gas flow path 8 which communicates with at least one of the drainage paths on both end sides, and the purge valve 9 through which the impurity gases are discharged from this off-gas flow path 8.

In the operating method of the above fuel cell system, the two control valves 7A and 7B are opened for a period of time required to drain the liquid-water buffers 6A and 6B, and the purge valve 9 is opened when the amount of the impurity gases dischargeable from both control valves 7A and 7B is smaller than the amount of the impurity gases generated in the fuel cell stack S.

More specifically, as shown in Part (B) of FIG. 9, one control valve 7A is opened for a period of time to required to drain the liquid-water buffer 6A (required drainage time), and the other control valve 7B is then opened for a period of time tB required to drain the liquid-water buffer 6B (required drainage time). Both required drainage times are the same length of time. Note that the timings to open the control valves 7A and 7B are not limited to the above case. For example, the other control valve 7B may be opened before the one control valve 7A, or both control valve 7A and 7B may be opened simultaneously.

This type of fuel cell system is known to have a tendency that increase in the temperature or current value of the fuel cell stack S increases the amounts of the resultant water and the impurity gases generated in the anode off-gas. For example, as shown in Part (A) of FIG. 10, the flow volume of product water on the anode side increases as the generated current increases, and the degree of that increase becomes more drastic as the operating temperature becomes higher. Moreover, as shown in Part (B) of FIG. 10, the amount of impurities flowing into the anode side also increases as the generated current increases, and the degree of that increase becomes more drastic as the operating temperature becomes higher. Thus, by measuring the temperature or current value of the fuel cell stack S, it is possible to estimate the amounts of the resultant water (product water) and the impurity gases (impurities) generated at that point of time.

In this respect, in the operating method of the fuel cell system, the amount of the resultant water generated is estimated from the temperature or current value of the fuel cell stack S to determine the required drainage times tA and tB at that point of time. Similarly, the amount of the impurity gases generated is estimated to determine a required purge time $tN_2$ at that point of time. Note that the required drainage times tA and tB urea period of time required for each of the control valves 7A and 7B to completely drain the amount of the resultant water thus estimated, and are a period of time long enough for one control valve to completely drain that amount.

Moreover, in the above operating method of the fuel cell system, when the two control valves 7A and 7B are opened for the required drainage times tA and tB described above, the two control valves 7A and 7B are opened for the required drainage times tA and tB which are the same length of time, regardless of the posture (inclination) of the vehicle. Thus, discharged is not only the resultant water but also the impurity gases.

Specifically, in the operating method of the fuel cell system, the total amount dischargeable from the two control valves 7A and 7B is greater because both control valves 7A and 7B are opened for the required drainage times tA and tB that allow complete drainage of the estimated amount of the resultant water as mentioned above. This results in a spare opening time in at least one of the control valves 7A and 7B, regardless of whether the amounts of the water held in the liquid-water buffers 6A and 6B on both sides are equal to or different from each other. During this opening time, the impurity gases can be discharged.

For example, in a case where the fuel cell stack S shown in Part (A) of FIG. 9 is tilted with its left side down, the resultant water is held mainly in one liquid-water buffer 6A on the left side. Then, as both control valves 7A and 7B are opened for the required drainage times tA and tB, the resultant water is discharged mainly from the one control valve 7A, and the impurity gases are discharged mainly from the other control valve 7B.

Here, in the operating method of the fuel cell system, the impurity gases cannot be completely discharged within the required drainage times tA and tB in a case where the amount of the impurity gases dischargeable from both control valves 7A and 7B while they are open for the required drainage times tA and tB is smaller than the estimated amount of the impurity gases generated in the fuel cell stack S. Thus, the purge valve 9 is opened for a period of time obtained by subtracting the required drainage time (tA or tB) from the required purge time $tN_2$, or a required discharge time tC for the remaining impurity gases. Note that the purge valve 9 is not opened in a case where the amount of the impurity gases dischargeable from both control valves 7A and 7B is larger than the estimated amount of the impurity gases, because the impurity gases can be discharged within the required drainage times tA and tB set for the control valves 7A and 7B.

As described above, according to the above operating method of the fuel cell system, it is possible to secure a good drainage function, and also to prevent excessive discharge of the hydrogen in the anode off-gas by opening each of the control valves 7A and 7B and the purge valve 9 only for the minimum length of time in accordance with the operating condition of the fuel cell system.

Incidentally, while Part (B) of FIG. 9 is an explanatory diagram of a case where the fuel cell stack S shown in Part (A) of FIG. 9 is tilted with its left side down, the operating method of the fuel cell system functions similarly in a case where the fuel cell stack S is tilted in the opposite direction. In this case, the impurity gases are discharged mainly from the one control valve 7A, which opens first, and the resultant water is discharged mainly from the other control valve 7B. Hence, the above operating method of the fuel cell system can achieve good functions of discharging the resultant water and the impurity gases even when a vehicle equipped with the fuel cell system is tilted or subjected to acceleration in any direction.

Figure 11:
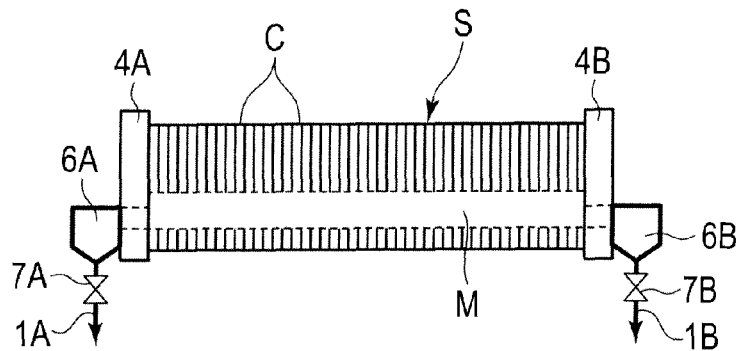
FIG. 11 is an explanatory diagram showing a fuel cell system (Part (A)), a timechart showing the operations of the valves in a state where a fuel cell stack shown in Part (A) is tilted with its right side down (Part (B)), and a timechart showing the operations of the valves in a state where the fuel cell stack shown in Part (A) is tilted with its left side down (Part (C)), according to another embodiment of the operating method of the fuel cell system of the present invention.
Figure 11:
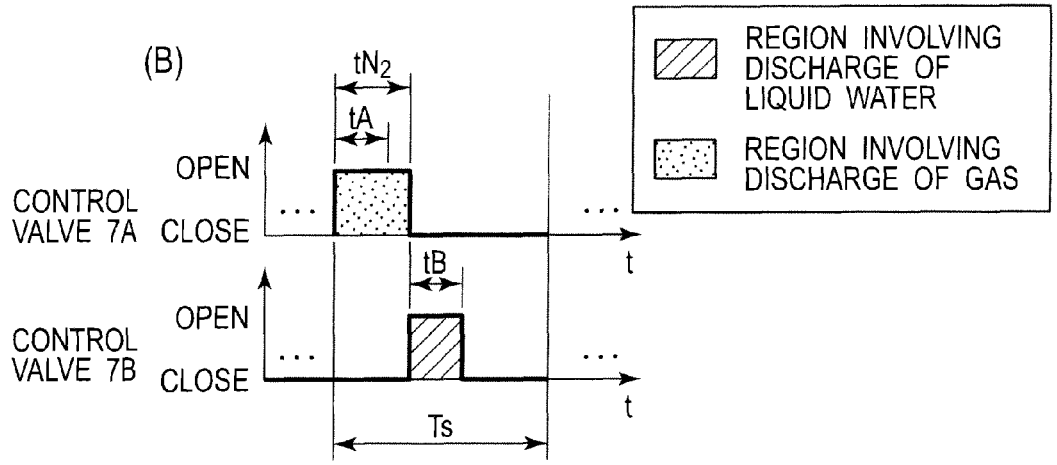
Figure 11:
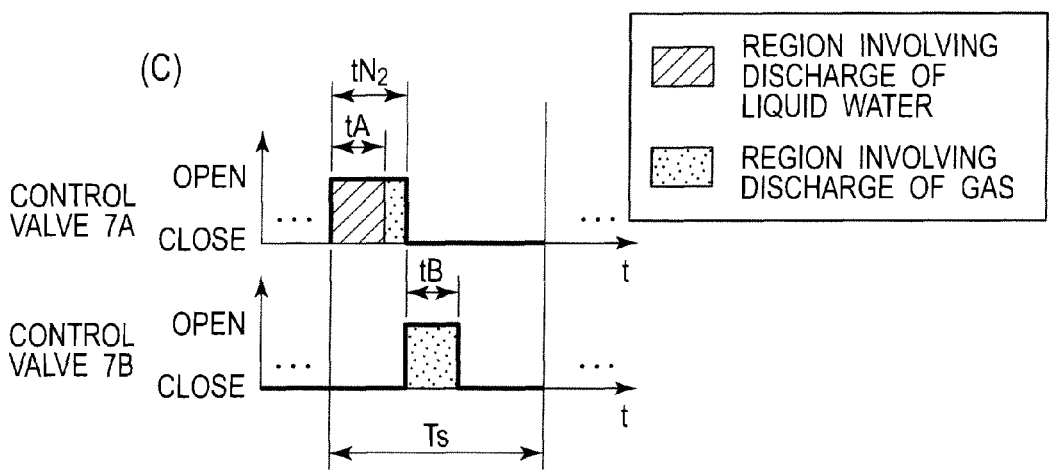

The fuel-cell-system operating method shown in FIG. 11 is an operating method of a fuel cell system shown in Part (A) of the same drawing. Its fuel cell stack S has the drainage paths 1A and 1B, the liquid-water buffers 6A and 6B, and the control valves 7A and 7B on both end sides thereof in the unit-cell stacking direction, respectively.

In the operating method of the above fuel cell system, one of the two control valves 7A and 7B, which is the control valve 7A, is opened for a period of time (tA) required to drain the liquid-water buffer 6A. For the other control valve 7B, the longer of a period of time (tB) required to drain the liquid-water buffer 6B and a period of time ($tN_2$) required to discharge the impurity gases is selected, and the other control valve 7B is opened for that period of time.

In this embodiment, too, the above periods of time tA and tB are equal values. The amounts of the product water and the impurity gases generated in the anode are estimated based on an operating condition such as the current generated by the fuel cell stack S or the temperature thereof. The values of the periods of time tA, tB, and $tN_2$ are set based on the result of this estimation.

Part (B) of FIG. 11 is an explanatory diagram of a case where the fuel cell stack S shown in Part (A) of FIG. 11 is tilted with its right side down. In this case, in the fuel cell system, the resultant water is held mainly in the other liquid-water buffer 6B on the right side in Part (A) of FIG. 11, and the impurity gases are held in the one liquid-water buffer 6A on the opposite side.

Here, in the operating method of the fuel cell system, the longer of the period of time (required drainage time) tA required to drain the liquid-water buffer 6A and the period of time (required discharge time) $tN_2$ required to discharge the impurity gases is selected, i.e., the required discharge time $tN_2$ for the impurity gases is selected, and the one control valve 7A on the left side in Part (A) of FIG. 11 is opened for the period of time $tN_2$. Subsequently, the other control valve 7B is opened for the required drainage time tB for the liquid-water buffer 6B. Note that the order in which to open the control valves 7A and 7B is not limited to the above case. For example, the other control valve 7B may be opened before the one control valve 7A, or both control valves 7A and 7B may be opened simultaneously.

As a result, the impurity gases are discharged from the one control valve 7A, and the resultant water is discharged from the other control valve 7B. Accordingly, the operating method of the fuel cell system secures a good drainage function, and also prevents excessive discharge of the hydrogen in the anode off-gas by opening each of the control valves 7A and 7B only for the minimum length of time in accordance with the operating condition of the fuel cell system.

The operating method of the fuel cell system functions similarly in a case where the fuel cell stack S is tilted in the opposite direction. Specifically, Part (C) of FIG. 11 is an explanatory diagram of a case where the fuel cell stack S shown in Part (A) of FIG. 11 is tilted With its left side down. In this case, in the fuel cell system, the resultant water is held mainly in the one liquid-water buffer 6A on the left side in Part (A) of FIG. 11, and the impurity gases are held in the other liquid-water buffer 6B on the opposite side.

Here, like the previous case, in the operating method of the fuel cell system, the longer of the required drainage time tA for the liquid-water buffer 6A and the required discharge time $tN_2$ for the impurity gases is selected, i.e., the required discharge time $tN_2$ for the impurity gases is selected, and the one control valve 7A on the left side in Part (A) of FIG. 11 is opened for the time $tN_2$. Subsequently, the other control valve 7B is opened for the required drainage time tB for the liquid-water buffer 6B. Note that the order in which to open the control valves 7A and 7B is not limited to the above case. For example, the other control valve 7B may be opened before the one control valve 7A, or both control valves 7A and 7B may be opened simultaneously.

As a result, in the operating method of the fuel cell system, the resultant water and part of the impurity gases are discharged from the one control valve 7A, and the remaining part of the impurity gases is discharged from the other control valve 7B. Accordingly, the operating method of the fuel cell system secures a good drainage function, and also prevents excessive discharge of the hydrogen in the anode off-gas by opening each of the control valves 7A and 7B only for the minimum length of time in accordance with the operating condition of the fuel cell system.

As described above, the above operating method of the fuel cell system can achieve good functions of discharging the resultant water and the impurity gases even when a vehicle equipped with the fuel cell system is tilted or subjected to acceleration in any direction. Incidentally, while the above embodiment has described the case where the required discharge time $tN_2$ for the impurity gases is longer, the required drainage time to for the liquid-water buffer 6B is selected if it is longer. In this case, too, it is possible to discharge all the resultant water and the impurity gases from the control valves 7A and 7B on both sides.

Figure 12:
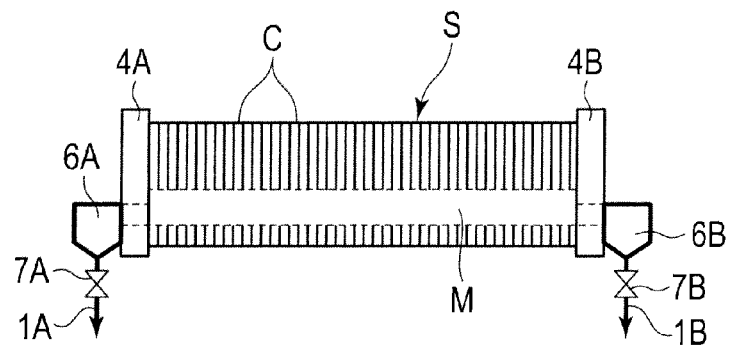
FIG. 12 is an explanatory diagram showing a fuel cell system (Part (A)), a timechart showing the operations of the valves in a state where a fuel cell stack shown in Part (A) is tilted with its right side down (Part (B)), and a timechart showing the operations of the valves in a state where the fuel cell stack shown in Part (A) is tilted with its left side down (Part (C)), according to another embodiment of the operating method of the fuel cell system of the present invention.
Figure 12:
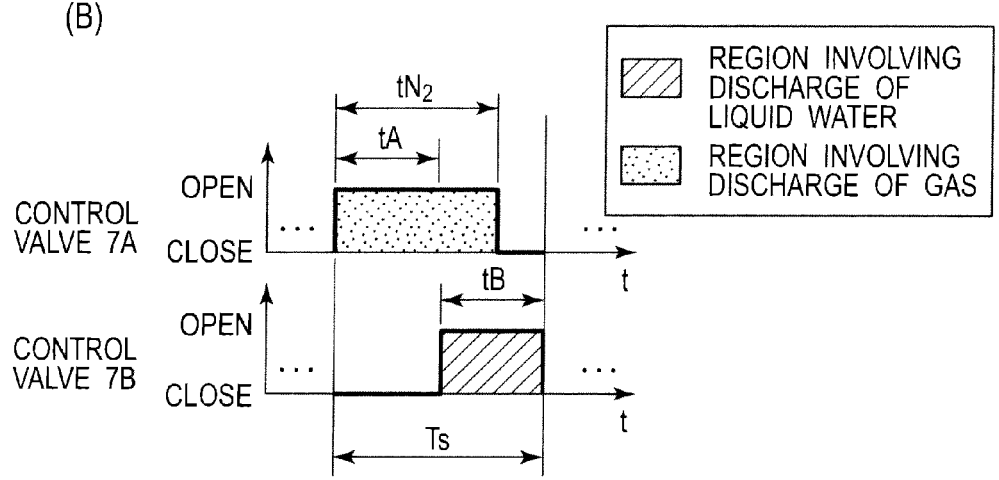
Figure 12:
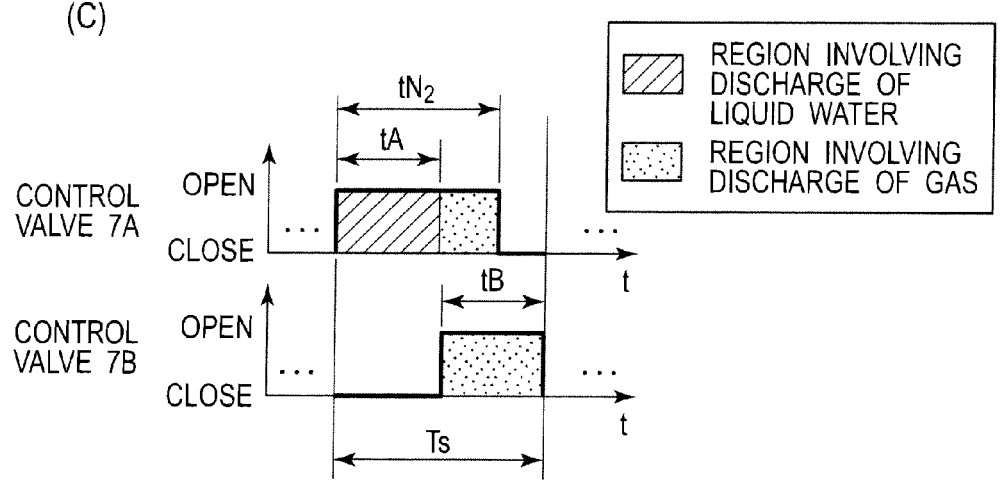

The fuel-cell-system operating method shown in FIG. 12 is an operating method of a fuel cell system shown in Part (A) of the same drawing. Its fuel cell stack S has the drainage paths 1A and 1B, the liquid-water buffers 6A and 6B, and the control valves 7A and 7B on both end sides thereof in the unit-cell stacking direction, respectively.

Like the embodiment shown in FIG. 11, in the operating method of the above fuel cell system, one control valve is opened for a period of time required to drain the corresponding liquid-water buffer. For the other control valve, the longer of a period of time required to drain the corresponding liquid-water buffer and a period of time required to discharge the impurity gases is selected, and the other control valve is opened for that period of time. Moreover, in this operating method, the two control valves 7A and 7B are opened for predetermined periods of time within a constant open-close control cycle. One control valve 7A is opened for a predetermined period of time from the start of the open-close control cycle. The other control valve 7B is opened for a predetermined period of time which starts this predetermined period of time before the end of the open-close control cycle. In other words, the other control valve 7B is controlled to close at the end of the open-close control cycle.

Part (B) of FIG. 12 is an explanatory diagram of a case where the fuel cell stack S shown in Part (A) of FIG. 12 is tilted with its right side down. In this case, in the fuel cell system, the resultant water is held mainly in the other liquid-water buffer 6B on the right side in Part (A) of FIG. 12, and the impurity gases are held in the one liquid-water buffer 6A on the opposite side.

Here, in the operating method of the fuel cell system, a predetermined open-close control cycle Ts is set. The longer of the required drainage time to for the liquid-water buffer 6A and the required discharge time $tN_2$ for the impurity gases is selected, i.e., the required discharge time $tN_2$ for the impurity gases is selected. The one control valve 7A on the left side in Part (A) of FIG. 12 is opened for the time $tN_2$ from the start of the open-close control cycle Ts. Then, in the operating method of the fuel cell system, the other control valve 7B is opened for a predetermined period of time (required drainage time) tB which starts this period of time tB before the end of the open-close control cycle Ts.

As a result, in the operating method of the fuel cell system, the impurity gases are discharged from the one control valve 7A and the resultant water is discharged from the other control valve 7B within the predetermined open-close control cycle Ts. Thus, the operating method can achieve operations and effects similar to those of the foregoing embodiments. In addition, even when the ratio of the periods of time to open both control valves 7A and 7B to the entire amount of the resultant water exceeds 100%, the period of time during which the left and right control valves 7A and 7B are both opened is minimized, and therefore the resultant water and the impurity gases can be discharged without being carried over to the next open-close control cycle.

Moreover, the operating method of the fuel cell system functions similarly in a case where the fuel cell stack S is tilted in the opposite direction. Specifically, Part (C) of FIG. 12 is an explanatory diagram of a case where the fuel cell stack S shown in Part (A) of FIG. 12 is tilted with its left side down. In this case, in the fuel cell system, the resultant water is held mainly in the one liquid-water buffer 6A on the left side in Part (A) of FIG. 12, and the impurity gases are held in the other liquid-water buffer 6B on the opposite side.

Here, like the previous case, in the operating method of the fuel cell system, the predetermined open-close control cycle Ts is set. Then, the longer of the required drainage time tA for the liquid-water buffer 6A and the required discharge time $tN_2$ for the impurity gases is selected, i.e., the required discharge time $tN_2$ for the impurity gases is selected. The one control valve 7A on the left side in Part (A) of FIG. 12 is opened for the time $tN_2$ from the start of the open-close control cycle Ts. Thereafter, in the operating method of the fuel cell system, the other control valve 7B is opened for the predetermined period of time (required drainage time) tB which starts this period of time tB before the end of the open-close control cycle Ts.

As a result, in the operating method of the fuel cell system, the resultant water and part of the impurity gases are discharged from the one control valve 7A, and the remaining part of the impurity gases is discharged from the other control valve 7B. Accordingly, the operating method of the fuel cell system secures a good drainage function, and also prevents excessive discharge of the hydrogen in the anode off-gas by opening each of the control valves 7A and 7B only for the minimum length of time in accordance with the operating condition of the fuel cell system.

As described above, like the foregoing embodiments, the above operating method of the fuel cell system can achieve good functions of discharging the resultant water and the impurity gases even when a vehicle equipped with the fuel cell system is tilted or subjected to acceleration in any direction. Further, the operating method can discharge the resultant water and the impurity gases without carrying them over to the next open-close control cycle, by minimizing the period of time during which the left and right control valves 7A and 7B are both opened. Incidentally, while the above embodiment has described the case where the required discharge time $tN_2$ for the impurity gases is longer, the required drainage time tA for the liquid-water buffer 6B is selected if it is longer. In this case, too, it is possible to discharge all the resultant water and the impurity gases from the control valves 7A and 7B on both sides.

Figure 13:
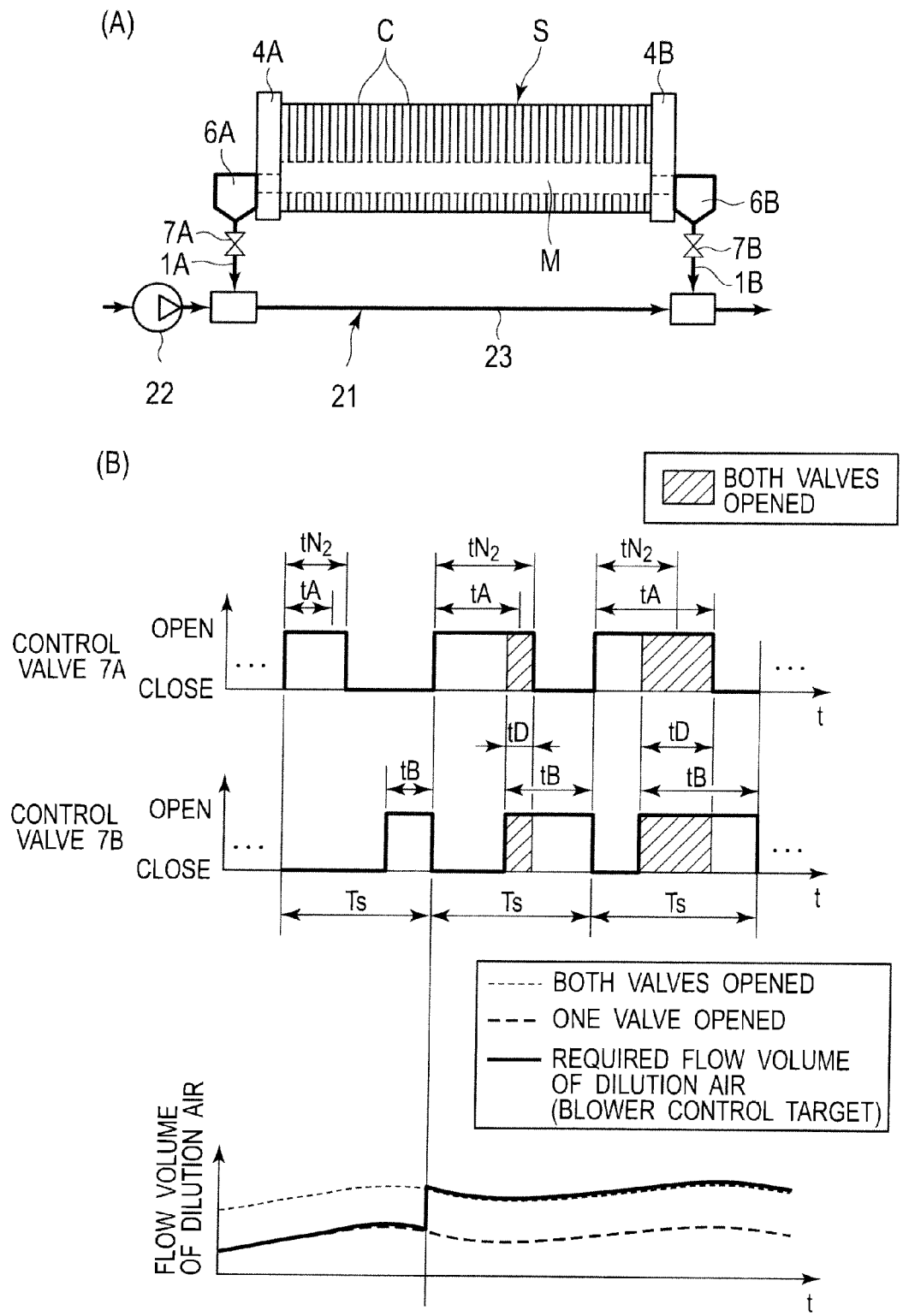
FIG. 13 is an explanatory diagram showing a fuel cell system (Part (A)), and a timechart showing the operations of the valves and changes in the flow volume of air for dilution (Part (B)), according to another embodiment of the operating method of the fuel cell system of the present invention.

A fuel-cell-system operating method shown in FIG. 13 is an operating method of a fuel cell system shown in Part (A) of the same drawing. Its fuel cell stack S has the drainage paths 1A and 1B, the liquid-water buffers 6A and 6B, and the control valves 7A and 7B on both end sides thereof in the unit-cell stacking direction, respectively. Moreover, the fuel cell stack S has a dilution-gas supply unit 21 which supplies a dilution gas for diluting the anode off-gas discharged from the two control valves 7A and 7B.

In this embodiment, the dilution-gas supply unit 21 is formed of a blower 22, piping 23, and the like. In addition, for the dilution gas, it is possible to use: one (cathode bypass gas) obtained by taking part of a gas supplied from a device (such as a compressor or blower) which supplies air to the cathode for power generation; the cathode off-gas after the reaction; or the like.

The operating method of the above fuel cell system is the operating method of the embodiment shown in FIG. 12 which uses the above dilution-gas supply unit 21 and performs such control as to increase the amount of the dilution gas to be supplied during each period of time during which the two control valves 7A and 7B are both opened.

Specifically, as shown in Part (B) of FIG. 13, the operating method of the fuel cell system increases the output of the blower 22 to increase the amount of the dilution gas to be supplied, during periods of time tD during which the two control valves 7A and 7B are both opened or during a given period including the periods of time tD during which the control valves 7A and 7B are both opened. That is, as the two control valves 7A and 7B are both opened, the concentration of the hydrogen in the anode off-gas increases as well. Thus, the flow volume of the air is increased in accordance with the situations where the two control valves 7A and 7B are both opened. In this way, the anode off-gas is diluted and then discharged to the outside. Accordingly, it is possible to prevent increase in the concentration of the hydrogen in the gas discharged from the system. Incidentally, while only one of the control valves 7A and 7B is opened, the output of the blower 22 is lowered to reduce the amount of the dilution gas to be supplied, so that the fuel consumption and noise-and-vibration performance are improved.

FIGS. 14 to 20 are diagrams for describing other embodiments of the fuel cell system of the present invention. Note that in the following embodiments, the same components as those in the foregoing embodiments will be denoted by the same reference signs, and detailed description thereof will be omitted.

Figure 14:
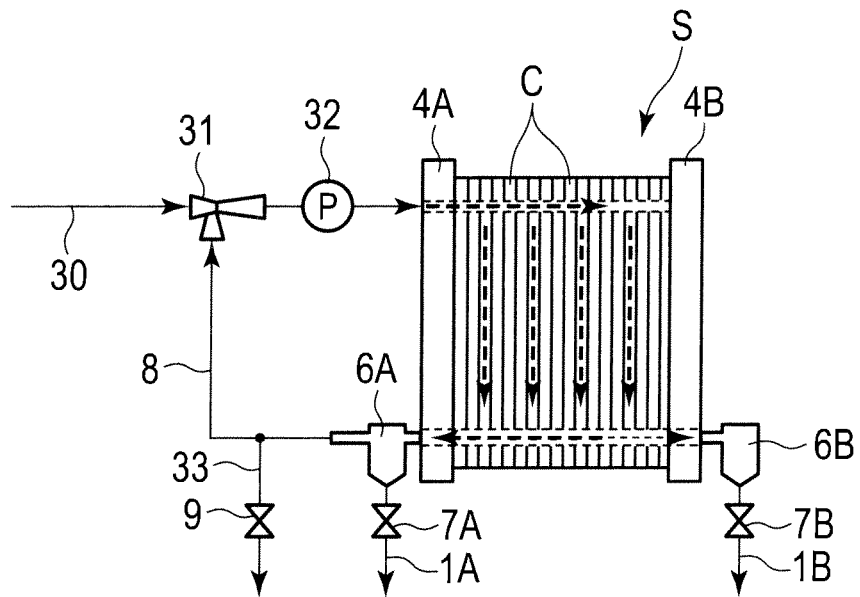
FIG. 14 is an explanatory diagram showing a fuel cell system of an anode-gas circulation type as another embodiment of the fuel cell system of the present invention.

The fuel cell system shown in FIG. 14 is a fuel cell system of an anode-gas circulation type designed to collect and reuse the unreacted hydrogen in the anode off-gas. The illustrated fuel cell system includes an anode-gas supply path 30 through which to supply the fuel cell stack S with the anode gas from the anode-gas supply unit (see reference sign 2 in FIG. 1), and a cathode-gas supply path (not shown). In the anode-gas supply path 30, an ejector 31 (pump) and a pressure sensor 32 are provided in this order.

Like the one shown in FIG. 3 mentioned above, the fuel cell stack S has the drainage paths 1A and 1B extending from the anode-off-gas discharge manifold M, on both end sides thereof in the stacking direction of the unit cells C, respectively. In both drainage paths 1A and 1B, the liquid-water buffers 6A and 6B and the control valves (drainage valves) 7A and 7B are provided, respectively. Moreover, the off-gas flow path 8 serving as a return flow path extending to the ejector 31 is joined to the liquid-water buffer 6A in one drainage path 1A on the left side in the drawing. The purge valve 9 for discharging nitrogen is provided in a branching flow path 33 connected to a middle portion of the off-gas flow path 8.

Like the foregoing embodiments, the above fuel cell system is mounted to an electric vehicle, for example, and discharges the resultant water and the impurity gases such as nitrogen contained in the anode off-gas through the drainage paths 1A and 1B at both ends of the fuel cell stack S. Here, even when the fuel cell stack S is tilted with its one side up due to the condition of the road or the like, the fuel cell system drains the water through the drainage path 1A (1B) at the lower position without fail and discharges the impurity gases mainly through the drainage path 1B (1A) at the higher position.

Meanwhile, the fuel cell system of an anode-gas circulation type described above has relatively low hydrogen circulation speed because it only involves supply of the unreacted hydrogen as is to the ejector 31 from one liquid-water buffer 6A. Here, this fuel cell system can securely discharge the resultant water and the impurity gases as described above. This means that anode-gas circulation type systems with low hydrogen circulation speed can also achieve good drainage and gas discharge functions. Moreover, reusing the unreacted hydrogen allows power generation with good fuel efficiency.

Further, like the foregoing embodiments, the above fuel cell system has excellent mountability under the floor of the vehicle, which is a small, limited space, because the height of the system structure can be made small.

Figure 15:
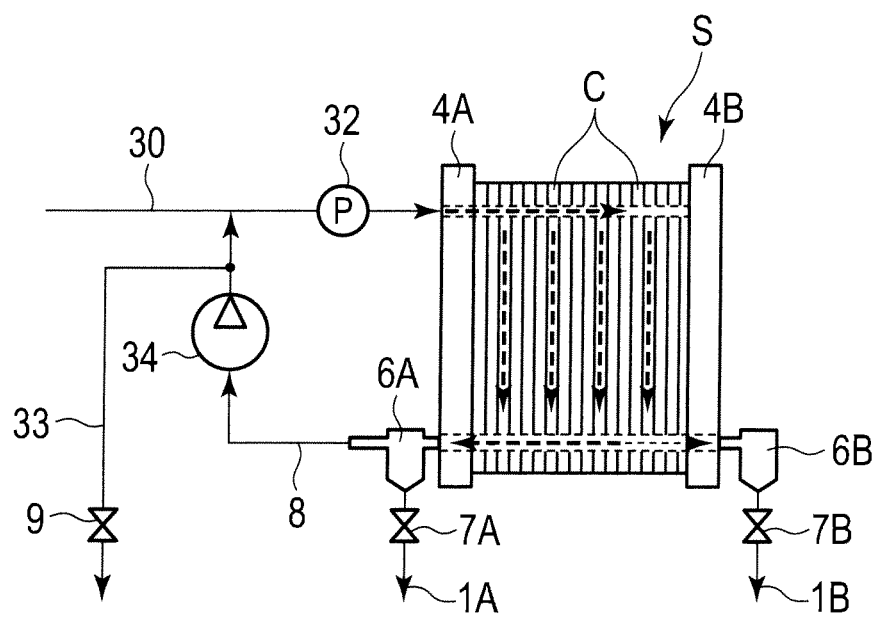
FIG. 15 is an explanatory diagram showing a fuel cell system of an anode-gas circulation type as another embodiment of the fuel cell system of the present invention.

The fuel cell system shown in FIG. 15 is a fuel cell system of an anode-gas circulation type like the above embodiment. In this embodiment, however, the anode-gas supply path 30 does not have the ejector (31). Instead, a circulation pump 34 (pump) is provided in a middle portion of the off-gas flow path 8 which extends to the anode-gas supply path 30 from the liquid-water buffer 6A on the left side in the drawing. Moreover, the branching flow path 33 including the purge valve 9 is provided in the off-gas flow path 8 at a position downstream of the circulation pump 34.

The above fuel cell system discharges the resultant water and the impurity gases contained in the anode off-gas by means of the liquid-water buffers 6A and 6B, the control valves 7A and 7B, and the purge valve 9, and also supplies the unreacted hydrogen to the fuel cell stack S by pumping the unreacted hydrogen to the anode-gas supply path 30 by means of the circulation pump 34.

The above fuel cell system can achieve operations and effects similar to those of the foregoing embodiments. Specifically, even anode-gas circulation type systems with low hydrogen circulation speed can achieve good drainage and gas discharge functions. Accordingly, the fuel cell system can achieve circulation and reuse of a sufficient amount of hydrogen by using a low flow-volume circulation pump 34. This contributes to reduction in the output of the drive device, reduction in the size and weight of the system structure, and reduction in the power consumption.

Figure 16:
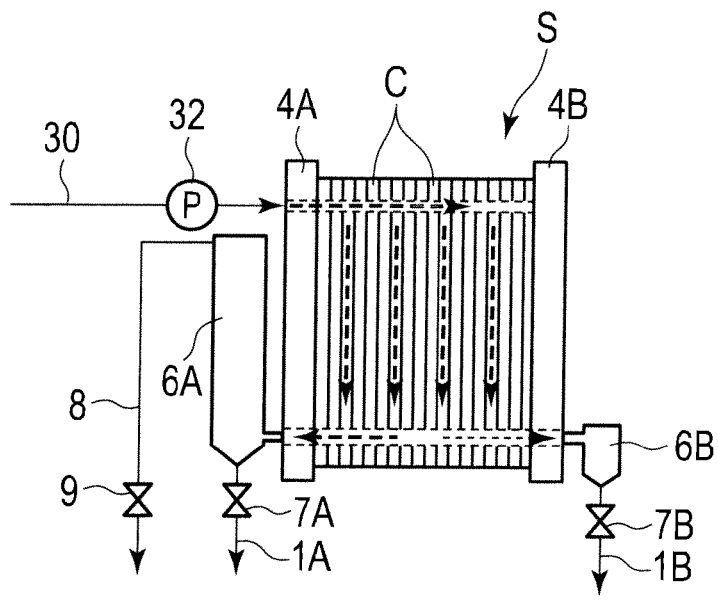
FIG. 16 is an explanatory diagram showing a fuel cell system of a non anode-gas circulation type as another embodiment of the fuel cell system of the present invention.

The fuel cell system shown in FIG. 16 is not a fuel cell system of any of the circulation types shown in FIGS. 14 and 15 but of a non anode-off-gas circulation type (anode dead-end system) which does not return the anode off-gas to the anode of the fuel cell stack S. Specifically, the fuel cell system includes the path 30 through which to supply the anode gas from the anode-gas supply unit (see reference sign 2 in FIG. 1) to the fuel cell stack S, and the cathode-gas supply path (not shown). The pressure sensor 32 is provided in the anode-gas supply path 30.

The fuel cell stack S has the drainage paths 1A and 1B extending from the anode-off-gas discharge manifold M, on both end sides thereof in the stacking direction of the unit cells C, respectively. The liquid-water buffers 6A and 6B and the control valves (drainage valves) 7A and 7B are provided in both drainage paths 1A and 1B, respectively. Moreover, the off-gas flow path 8 is joined to the liquid-water buffer 6A of the one drainage path 1A on the left side in the drawing. Further, the purge valve 9 is provided in a middle portion of the off-gas flow path 8. Here, outside the fuel cell stack S, an anode-off-gas discharge system formed of the anode-off-gas discharge manifold M, the drainage paths 1A and 1B, the liquid-water buffers 6A and 6B, the off-gas flow path 8, and the like is not in communication with an anode-gas supply system formed of the anode-gas supply unit, the anode-gas supply path 30, and the like. The anode-gas supply path 30 forms a non-circulative anode-gas supply path.

Like the foregoing embodiments, the above fuel cell system is mounted to an electric vehicle, for example, and discharges the resultant water and the impurity gases such as nitrogen contained in the anode off-gas through the drainage paths 1A and 1B at both ends of the fuel cell stack S. Here, even when the fuel cell stack S is tilted with its one side up due to the condition of the road or the like, the fuel cell system drains the water through the drainage path 1A (1B) at the lower position without fail and discharges the impurity gases mainly through the drainage path 1B (1A) at the higher position.

Meanwhile, in an operating method of the fuel cell system of the non anode-gas circulation type described above, the supply of the anode gas is temporarily stopped after the start of power generation, and the power generation is continued, so that the pressure of the anode-gas supply path 30 is lowered. Then, when the anode-gas supply path 30 reaches a predetermined pressure, the supply of the anode gas is resumed. When the supply is resumed, that gas flow is used to discharge the product water inside each unit cell C. Here, the fuel cell system has a good drainage function as described above. This means that non-anode-gas circulation type systems can quickly discharge the product water after the start of the power generation.

Moreover, like the foregoing embodiments, the above fuel cell system has excellent mountability under the floor of the vehicle, which is a small, limited space, because the height of the system structure can be made small.

Figure 17:
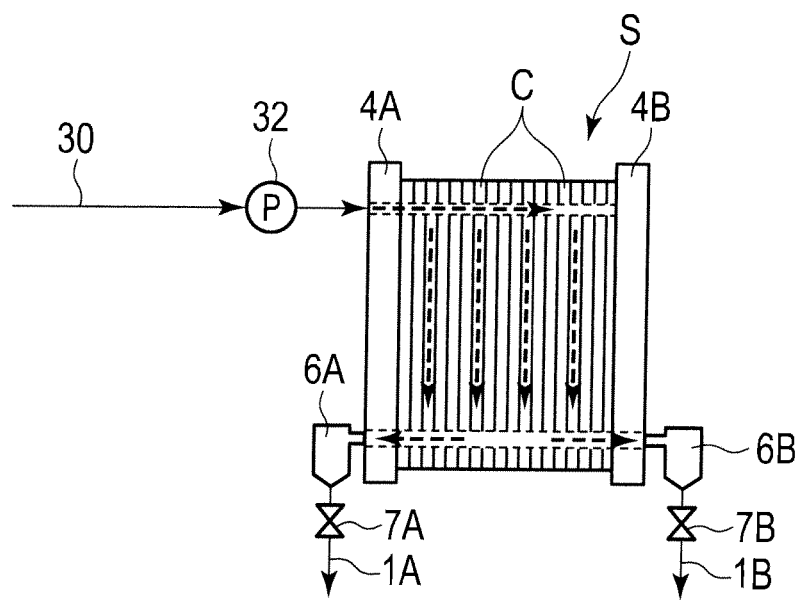
FIG. 17 is an explanatory diagram showing a fuel cell system of a non anode-gas circulation type as another embodiment of the fuel cell system of the present invention.

The fuel cell system shown in FIG. 17 is likewise a non anode-gas circulation type system and includes the drainage paths 1A and 1B on both end sides of the fuel cell stack S, and the liquid-water buffers 6A and 6B and the control valves (drainage valves) 7A and 7B are provided in both drainage paths 1A and 1B. Moreover, in the fuel cell system of this embodiment, the manifold M of the fuel cell stack S serves also as a buffer tank. Note that there may instead be a buffer tank serving also as a manifold.

Thus, the resultant water contained in the anode off-gas is held temporarily in the manifold M, serving also as a buffer tank, and then flowed to the liquid-water buffers 6A and 6B in the drainage paths 1A and 1B. Moreover, the impurity gases such as nitrogen contained in the anode off-gas are discharged to the outside through the liquid-water buffers 6A and 6B and the control valves 7A and 7B.

The above fuel cell system can also achieve operations and effects similar to those of the foregoing embodiments. In addition, since the manifold M inside the fuel cell stack S functions also as a buffer tank, the fuel cell system can achieve increase in the amount of the product water to be held and also achieve reduction in the size and weight of the liquid-water buffers 6A and 6B on the outside.

Figure 18:
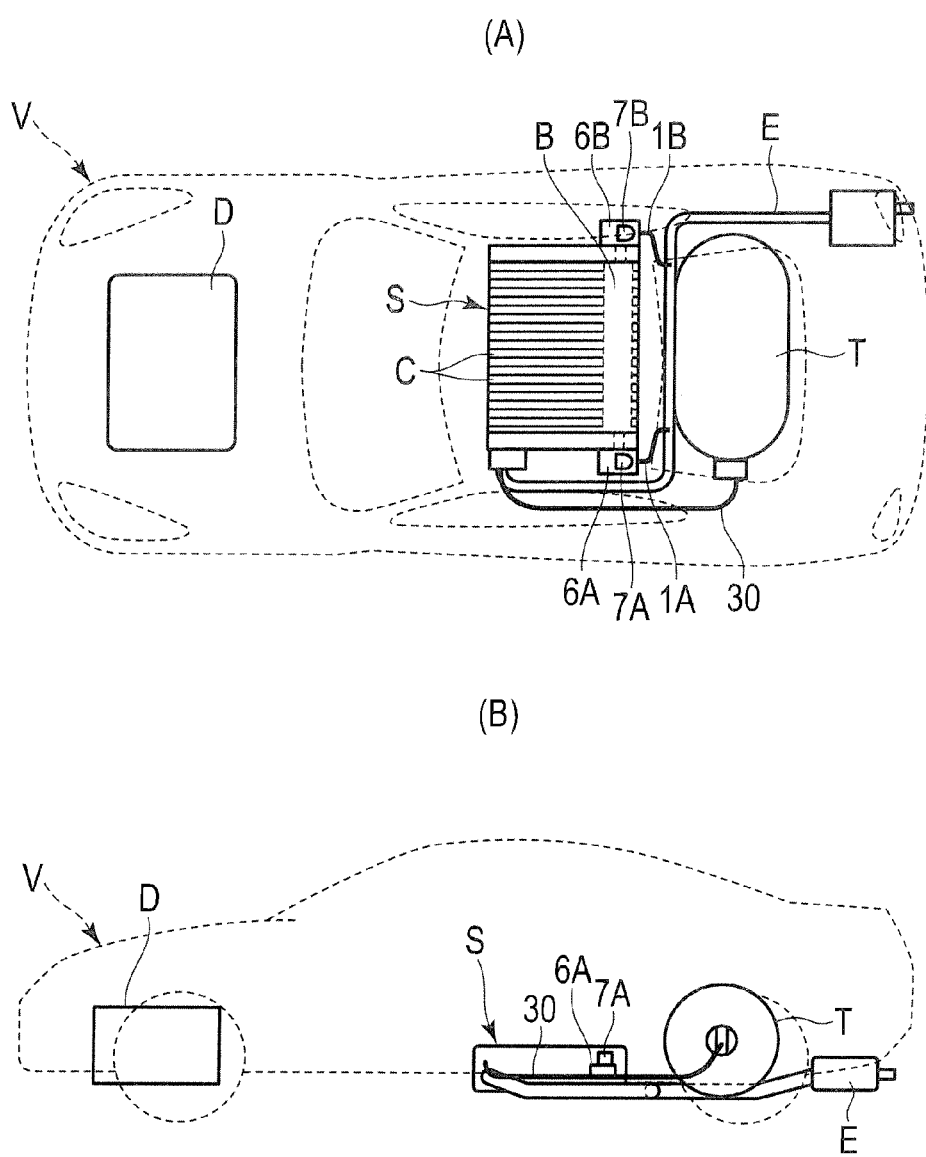
FIG. 18 is an explanatory plan view (Part (A)) and an explanatory side view (Part (B)) showing an on-board state as another embodiment of the fuel cell system of the present invention.
Figure 19:
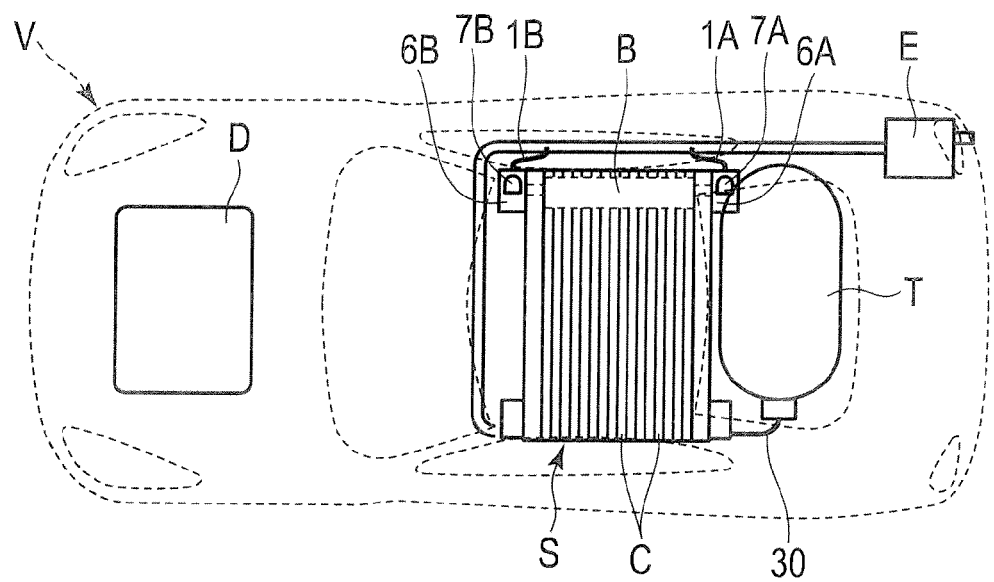
FIG. 19 is an explanatory plan view (Part (A)) and an explanatory side view (Part (B)) showing an on-board state as another embodiment of the fuel cell system of the present invention.
Figure 19:
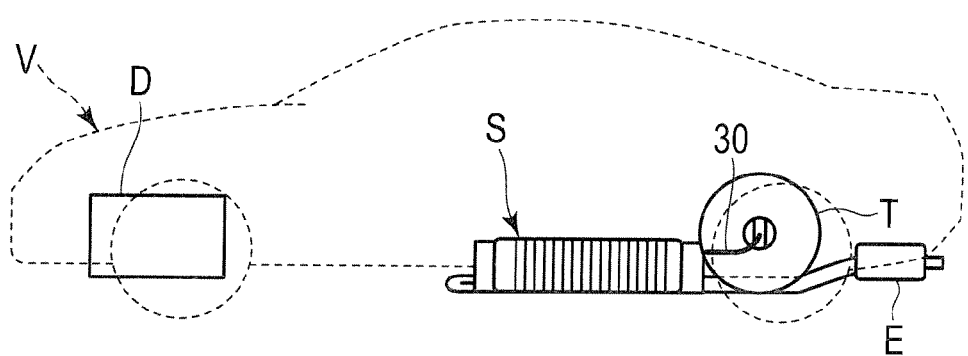
Figure 20:
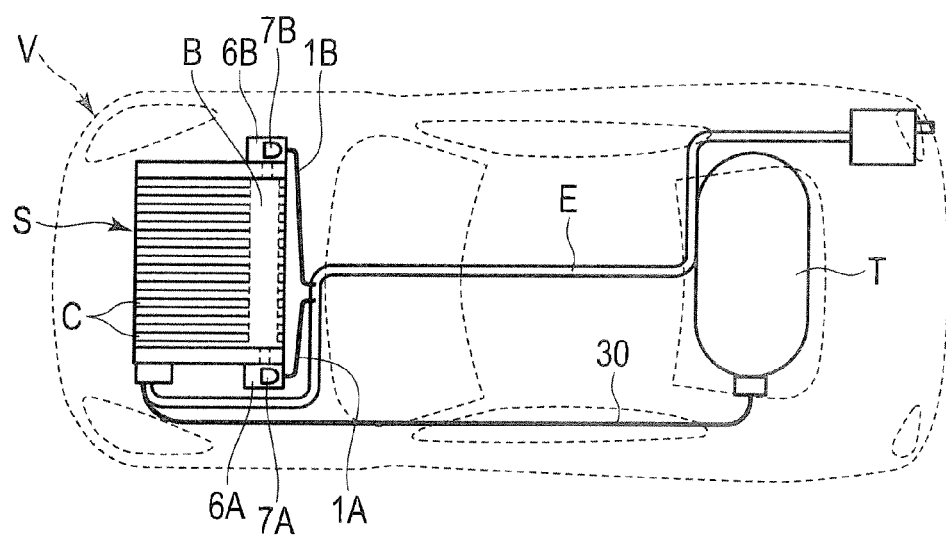
FIG. 20 is an explanatory plan view (Part (A)) and an explanatory side view (Part (B)) showing an on-board state as another embodiment of the fuel cell system of the present invention.
Figure 20:
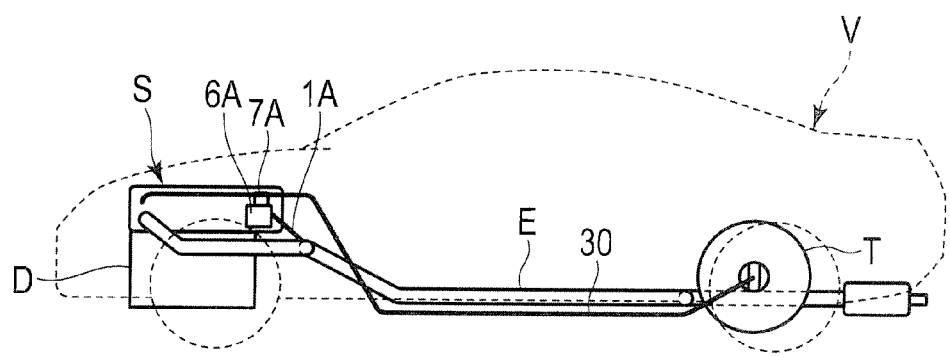

FIGS. 18 to 20 illustrate example configurations in which the fuel cell system of the present invention is mounted to a vehicle, as other embodiments thereof.

Specifically, the fuel cell system shown in FIG. 18 includes, in a vehicle V, the fuel cell stack S which is arranged under the floor below the rear seat, and a hydrogen tank T which is arranged between the left and right rear wheels. This hydrogen tank T corresponds to the anode-gas supply unit (see reference sign 2 in FIG. 1) mentioned above.

The fuel cell stack S incorporates a buffer tank B which serves also as a manifold. This fuel cell stack S has the drainage paths 1A and 1B provided with the liquid-water buffers 6A and 6B and the control valves (drainage valves) 7A and 7B, on both sides thereof in the stacking direction of unit cells C. The fuel cell stack S is mounted in such a way that the stacking direction of the unit cells C coincides with the left-right direction of the vehicle V. Moreover, the anode-gas supply path 30 is provided between the fuel cell stack S and the hydrogen tank T. Further, the fuel cell stack S is provided with an exhaust pipe E extending between the fuel cell stack S and the hydrogen tank T to the rear of the vehicle V. Both drainage paths 1A and 1B are in communication with this exhaust pipe E. The exhaust pipe E corresponds to the exhaust piping 5 in the embodiment shown in FIG. 1. Note that a drive unit D formed of a motor, an inverter, a speed reducer, and the like is arranged in the engine room of the vehicle V.

As mentioned in the foregoing embodiments, the fuel cell system is mountable under the floor of the vehicle V which is a small, limited space as shown in the illustrated example, because the height of the system structure can be made small. Moreover, even when the vehicle V is tilted to the left or right due to the condition of the road or the like or when the vehicle V is subjected to centrifugal force in the left-right direction due to its turning movement, the fuel cell system drains the water through the drainage path 1A (1B) at the lower position with respect to the tilt or the outer side with respect to the turn without fail and discharges the impurity gases through the drainage path 1B (1A) at the higher position with respect to the tilt or the like.

The fuel cell system shown in FIG. 19 has a basic configuration similar to that of the embodiment shown in FIG. 18. In the vehicle V, however, the fuel cell stack S is mounted in such a way that the stacking direction of the unit cells C coincides with the front-rear direction of the vehicle.

The above fuel cell system can achieve operations and effects similar to those of the foregoing embodiment. In addition, even when the vehicle V is tilted in the front-rear direction by traveling up and down a hill or when the vehicle is subjected to acceleration by moving from or to a standstill, the fuel cell system drains the water through the drainage path 1A (1B) at the lower position with respect to the tilt or the rear or front side without fail and discharges the impurity gases through the drainage path 1B (1A) at the higher position with respect to the tilt or the like.

The fuel cell system shown in FIG. 20 has a basic configuration similar to that of the embodiment shown in FIG. 18. In the vehicle V, however, the fuel cell stack S is arranged on the drive unit D in the engine room. This fuel cell stack S is mounted in such a way that the stacking direction of the unit cells C coincides with the left-right direction of the vehicle V.

The above fuel cell system can be mounted not only under the floor of the vehicle V, which is a small, limited space, but also inside the engine room of the vehicle V which is likewise a small, limited space, because the height of the system structure can be made small. Moreover, by being mounted in the engine room, the fuel cell system can not only achieve operations and effects similar to those of the embodiment of FIG. 18 but also expand the cabin compartment of the vehicle.

The configurations of the fuel cell system and the operating method thereof according to the present invention are not limited to the above embodiments. Details of the configurations can be changed optionally without departing from the gist of the present invention. For example, the embodiments of FIGS. 14 to 20 have each been described by taking, as an example, the fuel cell stack S having the drainage paths 1A and 1B, the liquid-water buffers 6A and 6B, and the control valves 7A and 7B on both end sides thereof in the unit-cell stacking direction; however, in these embodiments, the liquid-water buffer may be provided in at least one of the drainage paths on both end sides at a position upstream of the outlet port to the outside, or the liquid-water buffer may be omitted like the fuel cell system in FIG. 1. Moreover, as for the liquid-water buffer and the control valve which opens and closes the outlet port to the outside, at least one of the liquid-water buffer and the control valve may be provided to at least one of the drainage paths on both end sides. Further, the drainage paths on both end sides may include a common outlet port to the outside and a control valve which opens and closes this outlet port, in which case the drainage paths may be inclined downwardly toward the common outlet port. Furthermore, the bottom surface of the anode-off-gas discharge manifold in the fuel cell stack may be formed inclining downwardly to both end sides from a middle portion thereof in the unit-cell stacking direction being the highest point. In addition, the fuel cell systems shown in FIGS. 18 to 20 may each be a fuel cell system of any of the anode-gas circulation types shown in FIGS. 14 and 15.

This application is based upon and claims the benefit of priority from the prior Japanese Patent Application No. 2010-163747 filed on Jul. 21, 2010 and Japanese Patent Application No. 2011-137634 filed on Jun. 21, 2011, and the entire contents of these applications are incorporated herein by reference.

INDUSTRIAL APPLICABILITY

According to the fuel cell system and the operating method thereof according to the present invention, the fuel cell system has excellent mountability under the floor of a vehicle because the height of the system structure can be made small, and even systems with low hydrogen circulation speed can achieve a good drainage function.

REFERENCE SIGNS LIST

C unit cell
M anode-off-gas discharge manifold
S fuel cell stack
1A, 1B drainage path
6 liquid-water buffer
6A, 6B, liquid-water buffer
7 control valve
7A, 7B control valve
8 off-gas flow path
9 purge valve
10 (common) outlet port
21 dilution-gas supply unit

The invention claimed is:

1. An operating method of a fuel cell system comprising:
arranging a fuel cell stack formed by stacking a plurality of unit cells, in such a direction that a stacking direction of the unit cells is horizontal;
providing, in the fuel cell stack, manifolds through which reaction gases are supplied to and discharged from each of the unit cells;
providing a first drainage path and a second drainage path, each of the first and second drainage paths extending from an anode-off-gas discharge manifold, the first drainage path extending from a first end side of the fuel cell stack in the stacking direction of the unit cells and the second drainage path extending from a second end side of the fuel cell stack in the stacking direction of the unit cells;
providing a first liquid-water buffer in the first drainage path and a second liquid-water buffer in the second drainage path, the first and second liquid-water buffers located at positions upstream of outlet ports to an outside and configured to hold resultant water;
providing a first control valve in the first drainage path and a second control valve in the second drainage path, the first and second control valves configured to open and close the outlet ports to the outside, respectively;
providing an off-gas flow path which communicates with at least one of the first and second drainage paths, and a purge valve which discharges an impurity gas from the off-gas flow path;
opening the first control valve for a first predetermined drainage time that is a period of time required to drain a total amount of the resultant water held in the first liquid-water buffer through the first control valve, and opening the second control valve for a second predetermined drainage time that is a period of time required to drain a total amount of the resultant water held in the second liquid-water buffer through the second control valve; and
opening the purge valve in response to a total amount of the impurity gas discharged from the first and second control valves while the first and second control valves are opened for the first and second predetermined drainage time, respectively, being smaller than an amount of the impurity gas generated in the fuel cell stack.

* * * * *